United States Patent [19]
Hasegawa

[11] Patent Number: 5,559,291
[45] Date of Patent: Sep. 24, 1996

[54] ANGULAR VELOCITY SENSOR

[75] Inventor: Tomoyasu Hasegawa, Nagaokakyo, Japan

[73] Assignee: Murata Manufacturing Co., Ltd., Nagaokakyo, Japan

[21] Appl. No.: 284,611

[22] PCT Filed: Jan. 28, 1994

[86] PCT No.: PCT/JP94/00114

§ 371 Date: Aug. 29, 1994

§ 102(e) Date: Aug. 29, 1994

[87] PCT Pub. No.: WO94/17363

PCT Pub. Date: Aug. 4, 1994

[30] Foreign Application Priority Data

Jan. 29, 1993 [JP] Japan ................... 5-34534

[51] Int. Cl.$^6$ .............. G01C 19/00; G01P 3/44; G01P 9/00; G01P 15/08
[52] U.S. Cl. .................. 73/504.12; 73/504.02
[58] Field of Search ............. 73/517 A, 517 AV, 73/505, 504, 517 R, 510, 504.02, 504.12

[56] References Cited

U.S. PATENT DOCUMENTS

| | | | |
|---|---|---|---|
| 2,544,646 | 3/1951 | Barnaby et al. | 73/505 |
| 4,930,351 | 6/1990 | Macy et al. | 73/505 |
| 5,025,346 | 6/1991 | Tang et al. | 73/517 AV |
| 5,275,047 | 1/1994 | Zabler et al. | 73/505 |
| 5,331,853 | 7/1994 | Hulsing, II | 73/505 |
| 5,359,893 | 11/1994 | Dunn | 73/505 |

*Primary Examiner*—Hezron E. Williams
*Assistant Examiner*—Richard A. Moller
*Attorney, Agent, or Firm*—Oblon, Spivak, McClelland, Maier & Neustadt, P.C.

[57] ABSTRACT

An angular velocity sensor arranged to minimize the influence of viscous resistance of gases in association with a vibratory member, and to enhance the sensitivity of angular velocity detection through reduction of noises. The angular velocity sensor includes a first vibratory member supported on a first support beam for vibration in horizontally lateral direction perpendicular to the support axis, a second vibratory member horiztonally supported through a second support beam at a position on the support axis and inward of the first vibratory member for vibrations in the horizontally lateral direction and at the same time in the vertical direction to the face of an upper substrate, and a vibration generating means for imparting vibrations to the first and second vibratory members in the horizontally lateral direction. With these arrangements, when a turning moment about the support axis is applied, the second vibratory member is displaced in the vertical direction under the influence of Coriolis force, and an angular velocity signal indicative of this displacement is produced by a displacement detector.

11 Claims, 11 Drawing Sheets

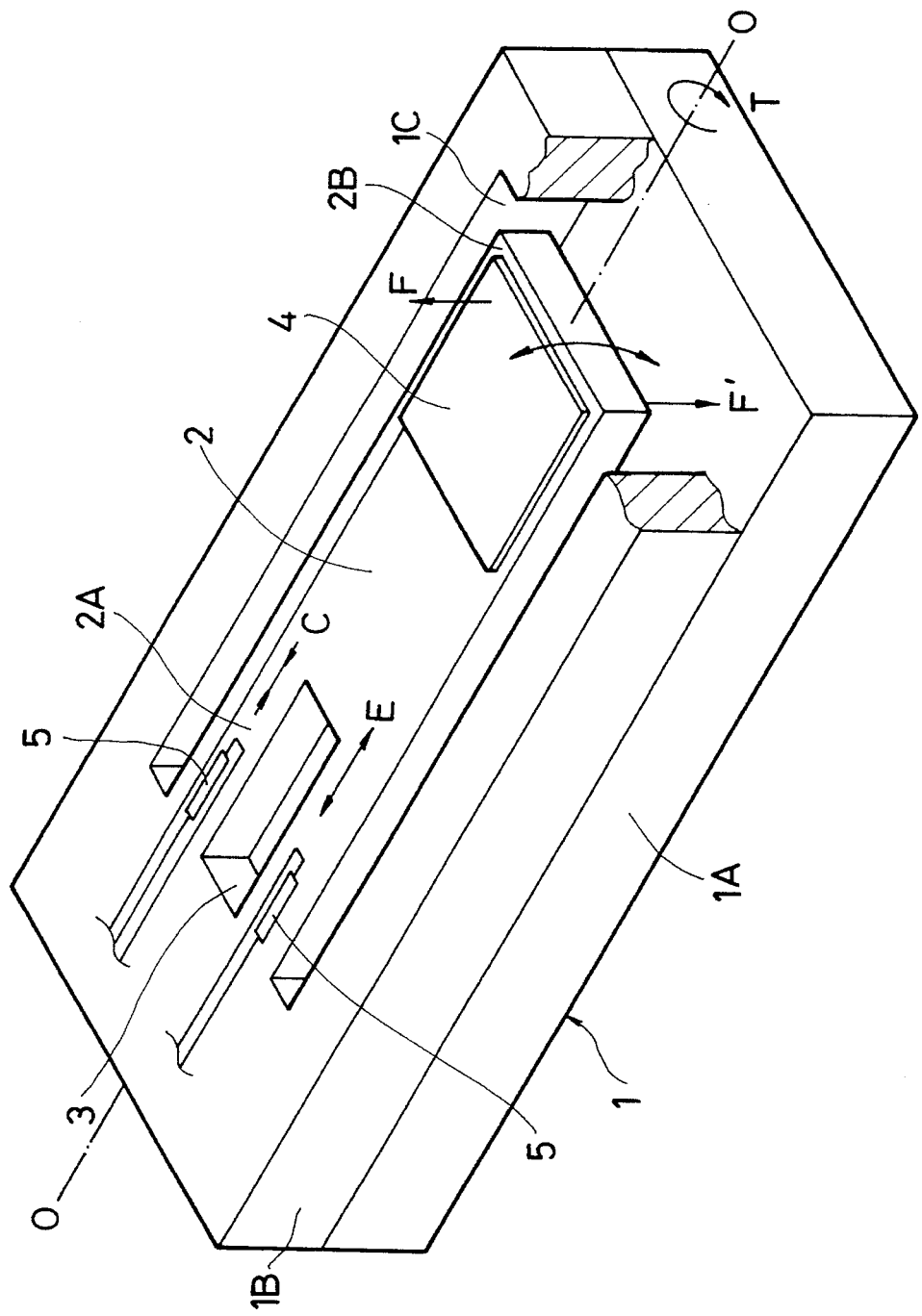

ANGULAR VELOCITY SENSOR

TECHNICAL FIELD

This invention relates to an angular velocity sensor which is suitable for use, for example, in detecting turning directions or postures of a motor vehicle or of an aircraft or the like.

BACKGROUND ART

Recently, as for angular velocity sensors of relatively small sizes, many efforts have been directed to the development of vibration type angular velocity sensors. The angular velocity sensors of this type are generally arranged to detect the angular velocity electronically from a displacement of a vibratory member under the influence of Coriolis force which is known to be proportional to the angular velocity, through the use of piezoelectric elements located in association with the vibratory member.

The angular velocity sensors of this nature usually involve a fabrication process of extremely high precision, which is very expensive, for example, a fabrication process utilizing semiconductor fabrication techniques (as proposed in Japanese Patent Laid-open No. Sho61-114123 and Sho61-139719).

In this connection, FIG. 12 illustrates a prior art angular velocity sensor as disclosed in the above-mentioned Japanese Patent Laid-open No. Sho61-139719.

In FIG. 12, indicated at 1 is a silicon substrate structure largely constituted by a lower substrate 1A which is shown on the lower side in that figure, an upper substrate 1B which is located over the lower substrate 1A, and a space 1C which is formed between the two substrates 1A and 1B to permit vibration of a cantilever type support beam 2 as will be described hereinlater.

Denoted at 2 is a thin-walled cantilever support beam which is formed integrally in the upper substrate 1B of the substrate structure 1 by etching technology or the like. The cantilever support beam 2 is fixed at one end, that is, at its base end 2A which is fixedly connected to the upper substrate 1B, and disposed freely at the other end 2B for vibration in upward and downward directions perpendicularly to the face of the substrate 1. Further, a rectangular slot 3 is formed longitudinally and centrally of the cantilever support beam 2 in a base end portion 2A thereof.

The reference 4 denotes an electrode which is formed on the top surface of a fore free end portion 2B of the cantilever support beam 2. The electrode 4 is connected through a lead wire to an oscillator circuit which generates a predetermined frequency signal (both of the lead wire and the oscillator circuit not shown). Upon applying the predetermined frequency signal to the cantilever support beam 2 through the electrode 4, the cantilever support beam 2 is vibrated up and down by the electrostatic force which occurs between the cantilever support beam 2 and the lower substrate 1A.

Designated at 5 are piezoresistance elements which are located on the opposite sides of the slot 3 in a base end portion 2A of the cantilever support beam 2 to detect, by way of a variation in resistance, the degree of stress to which the cantilever support beam 2 is subjected when the substrate structure 1 is put in rotation. Output signals of the piezoresistance elements 5, indicative of the angular velocity in the rotational direction, are fed to a signal processing circuit (not shown).

In case of the prior art angular velocity sensor of the above-described construction, upon applying a predetermined frequency signal from the oscillator circuit through the electrode 4, electrostatic force is produced to vibrate the fore end portion 2B of the cantilever support beam 2 up and down in the vertical direction, for example, at its own resonance frequency. In this vibrating state, if a torque T about a rotational axis O is applied to the substrate structure 1, the cantilever support beam 2 is subjected to a certain degree of torsional strain (stress) under the influence of Coriolis forces F and F'. This rotational strain exerts compressive stress C and tensile stress E on the opposite sides of the slot 3. As a result, the piezoresistance elements 5 produce signals commensurate with the compressive stress C and the tensile stress E, respectively, which are indicative of the angular velocity of the applied torque T.

In this regard, according to the above-described prior art angular velocity sensor, while vibrating the cantilever support beam 2 up and down, the stresses which correspond to the angular velocity of the torque T are detected from the respective piezoresistance elements 5 on the basis of Coriolis forces. However, the cantilever support beam 2 which is constantly put in vibration in a vertical direction to the substrate structure 1 is susceptible to influences of viscous resistance of air, and therefore involves complication of its vibrational excitation mechanism.

Accordingly, with the above-described prior art angular velocity sensor arrangements, the energy for vibrating the cantilever support beam 2 is wastefully spent by the viscous resistance of air, which results not only in extremely low energy efficiency but also in low sensitivity of the piezoresistance elements 5 in the detection of the angular velocity by limiting the amplitude of their vibrations.

Besides, the prior art angular velocity sensor, which is arranged to detect the torsional strain of the cantilever support beam 2 which is put in vibration, has an inherent drawback that it can afford only low sensitivity for the detection of angular velocity. Namely, according to the prior art which employs one and single cantilever support beam 2 for both vibrational excitation and detection purposes, there always arises a problem that, when the cantilever support beam 2 is put in vibration to utilize Coriolis force, the cantilever support beam 2 is torsioned at its base end 2A by its own vibration. The resulting torsional strains are picked up by the respective piezoresistance elements 5 to increase the background noises to such a degree as to render detection of fine angular velocities difficult or to degrade the angular velocity detection sensitivity and accuracy to an objectionable degree.

In view of the above-described problems or drawbacks of the prior art, the present invention has as its object the provision of an angular velocity sensor which is arranged to suppress the influence of the viscous resistance of gases in association with a vibratory member and to enhace the angular velocity detection sensitivity through reduction of noises.

DISCLOSURE OF THE INVENTION

In accordance with the invention, the above-stated objective is achieved by the provision of an angular velocity sensor essentially including: a substrate; a first vibratory member supported on the substrate through a first support beam for vibration in horizontally lateral directions relative to the substrate; a second vibratory member located on a support axis of the first support beam and supported horizontally on the first vibratory member through a second support beam for vibrations in the horizontally lateral directions and also in vertical directions relative to the face of the substrate; a vibration generating means actuatable to impart vibrations to the first vibratory member in the horizontally lateral directions relative to the substrate; and a displacement detection means adapted to detect the extent of displacement of the second vibratory member in the vertical direction while the same is put in vibrations by the vibration generating means.

With an angular velocity sensor which is arranged in the above-described manner, as soon as the first vibratory member is put in vibration by the vibration generating means in horizontally lateral directions relative to the substrate, the second vibratory member is vibrated in the horizontally lateral directions together with the first vibratory member. Then, if the sensor as a whole is turned in this state about the support axis of the first support beam, the second vibratory member is displaced in a vertical direction to the substrate under the influence of Coriolis force which acts on the second vibratory member according to the angular velocity of the turning moment acting on the sensor. This displacement of the second vibratory member in the vertical direction is detected by the displacement detection means to produce an output signal indicative of the angular velocity of the turning moment.

In this instance, the above-mentioned vibration generating means is preferably constituted by movable conducting sections located at the opposite lateral sides of the first support beam and stationary or fixed conducting sections provided on the part of the substrate body in face to face relation with the movable conducting sections, and adapted to vibrate the first vibratory member together with the second vibratory member upon application of a frequency signal to the respective conducting sections.

The displacement detection means is peferably constituted by a bridge circuit containing a pair of piezoresistance elements located on the second support beam in spaced positions in the transverse direction thereof and a pair of piezoresistance elements located on the first vibratory member.

Alternatively, the displacement detection means may be constituted by a conducting section provided on the second vibratory member and another conducting section provided on the remainder of the substrate body in confronting relation with the first-mentioned conducting section, detecting a displacement of the second vibratory member in the vertical direction by way of a variation in capacitance between the two conducting sections.

Further, in a preferred form of the angular velocity sensor according to the present invention, the first vibratory member is constituted by a cantilever frame supported on the first support beam, and the second vibratory member is constituted by a cantilever plate supported on the second support beam in a position within the frame structure of the first vibratory member.

In still another preferred form of the angular velocity sensor according to the invention, the first vibratory member is constituted by a frame having the opposite ends thereof supported by a pair of first support beams aligned on a common support axis, and the second vibratory member is constituted by a cantilever plate supported on the second support beam in a position inward of the frame structure of the first vibratory member.

Moreover, in a preferred form of the angular velocity sensor according to the invention, the substrate is composed of a lower substrate and an upper substrate joined with each other through an insulation layer, the first and second vibratory members being integrally defined in the upper substrate in a shaping process for the upper substrate.

BRIEF DESCRIPTION OF DRAWINGS

In the accompanying drawings:

FIG. 12 is a partly cutaway perspective view of a prior art angular velocity sensor.

BEST MODE FOR CARRYING OUT THE INVENTION

Now, the invention is described more particularly by way of its preferred embodiments shown in FIGS. 1 through 11 each exemplifying an independent single angular velocity sensor unit as one form of application of the invention.

Figure 1:
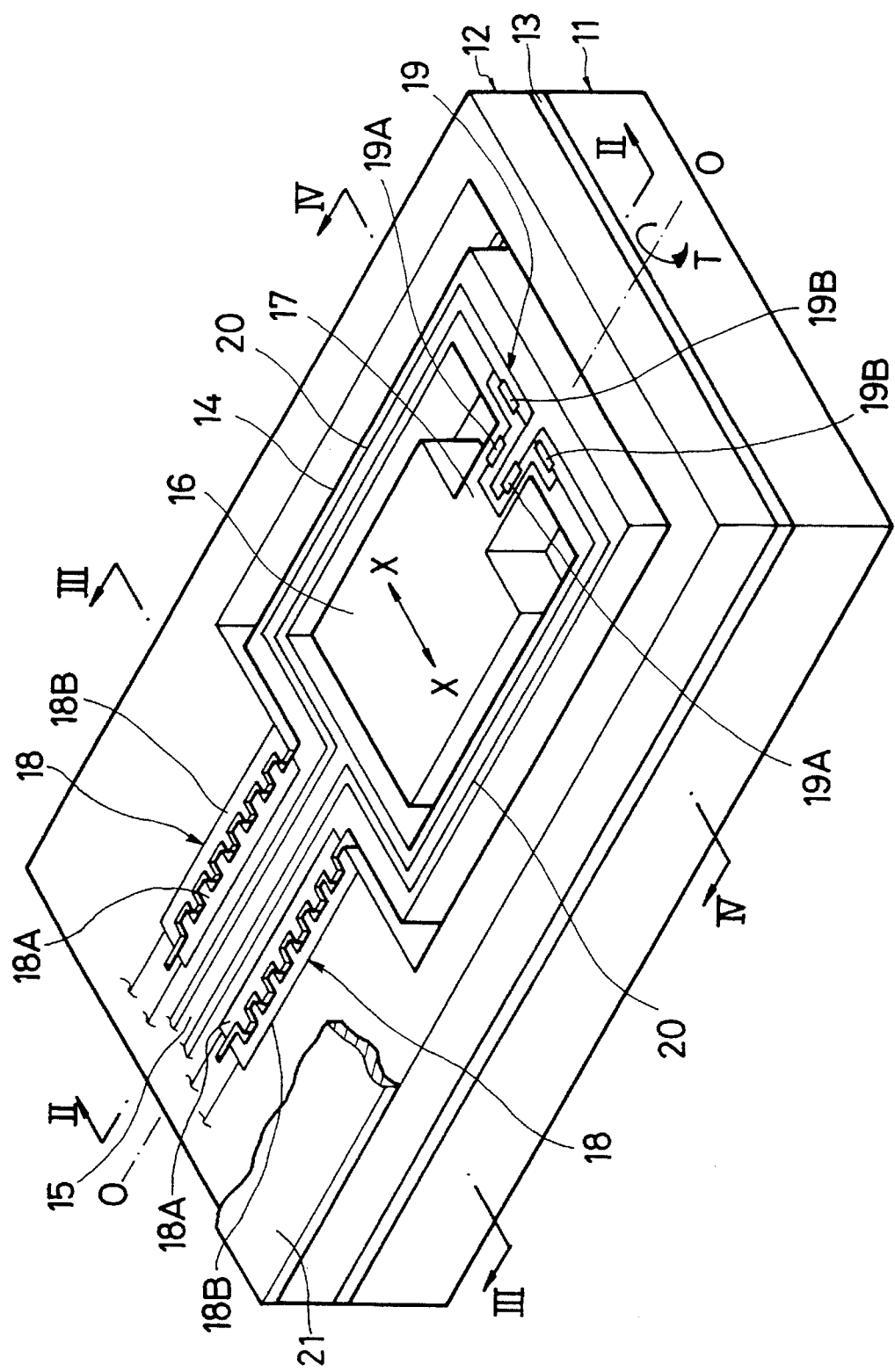
FIG. 1 is a perspective view of an angular velocity sensor in a first embodiment of the invention, the angular velocity sensor having its outer protective layer removed for the purpose of illustration.
Figure 2:
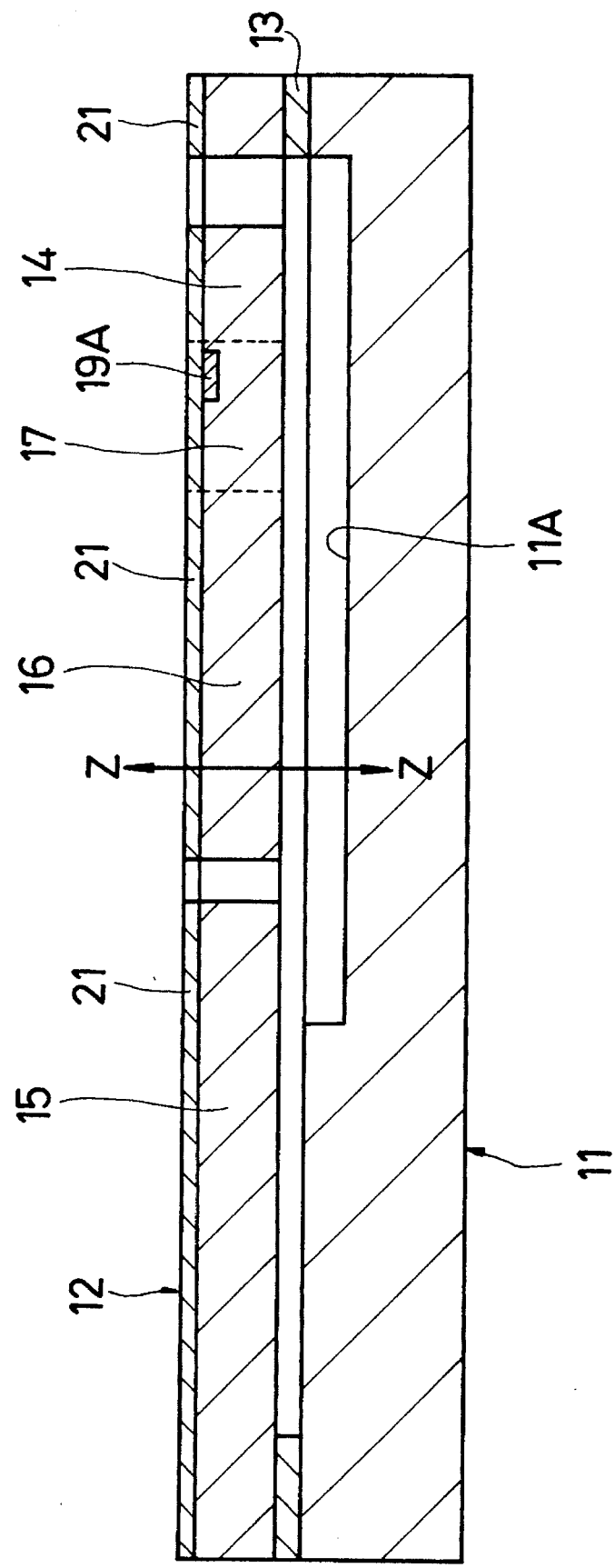
FIG. 2 is an enlarged sectional view taken on line II—II of FIG. 1.
Figure 3:
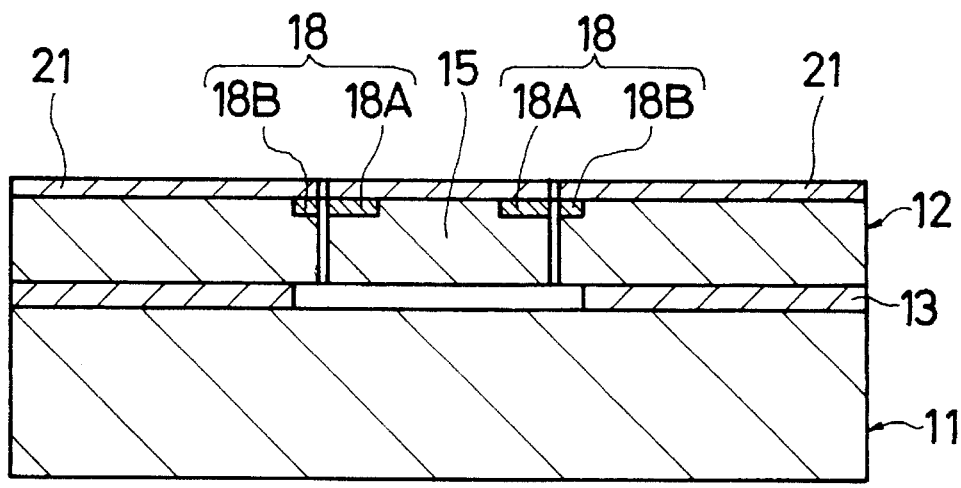
FIG. 3 is an enlarged sectional view taken on line III—III of FIG. 1.
Figure 4:
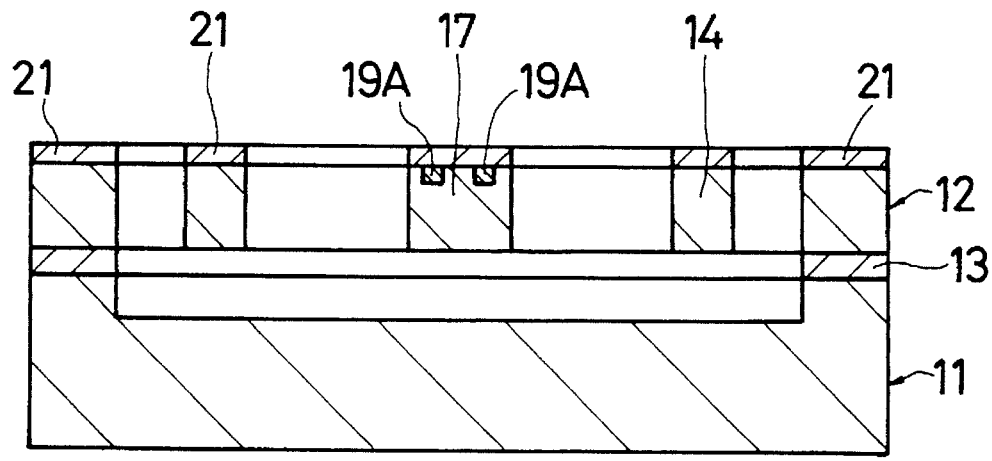
FIG. 4 is an enlarged sectional view taken on line IV—IV of FIG. 1.

Referring to FIGS. 1 through 10, there is shown a first embodiment of the invention, including a lower substrate 11 formed of a silicon material, an upper substrate 12 formed of a silicon material and affixed on the upper side of the lower substrate 11 through an oxide film 13. As will be described below, a first vibratory member 14 and a second vibratory member 16 are integrally defined in the upper substrate 12 by etching techniques. The lower substrate 11 is centrally formed with a recess 11A as shown in FIG. 2.

Indicated at 14 is the first vibratory member in the form of a rectangular frame which is formed substantially centrally of the upper substrate 12. The first vibratory member 14 is supported at its base end in the fashion of cantilever through a support beam 15 and disposed flatly in flush with the face of the upper substrate 12. In this instance, the first support beam 15 is fixed at its base end which is connected to the upper substrate 12, and disposed in free state at its fore end which is extended toward a center portion of the upper substrate 12 and which is formed integrally with the first vibratory member 14. When vibration is imparted to the first support beam 15 by vibration generating sections 18 which will be described below, the first vibratory member 14 is put in vibration within the plane of the upper substrate 12 in a horizontally lateral direction of X—X which perpendicularly intersects a longitudinal support axis O—O of the support beam 15.

Denoted at 16 is the second vibratory member of a square plate-like shape, which is located centrally of the upper substrate 12 and within the frame structure of the first vibratory member 14. The second vibratory member 16 is supported horizontally on the first vibratory member 14 in the fashion of cantilever through a second support beam 17, and, as shown in FIG. 2, disposed horizontallly flush with the face of the upper substrate 12 for vibrations in the horizontally lateral direction X—X perpendicular to the support axis O—O as well as in a vertical direction Z—Z to the plane of the upper substrate 12. Upon application of a torque or a turning moment T about the support axis O—O, the second vibratory member 16 which is put in vibration in the horizontal direction X—X together with the first vibratory member 14, is also vibrated in the vertical direction Z—Z of FIG. 2 under the influence of Coriolis force.

The base end of the second support beam 17 is connected to the first vibratory member 14 in opposingly confronting relation with the first support beeam 15, while its fore end is extended toward the center of the first vibratory member 14 and disposed as a free end, having its support axis in alignment with the support axis O—O of the first support beam 15. Besides, when the first vibratory member 14 is put in vibration by a vibration generating sections 18 in the lateral direction X—X, the second support beam serves to amplify the horizontal vibration before transmission to the second vibratory member 16. For this purpose, it is formed in predetermined dimensions particularly in length and thickness.

Designated at 18 are vibration generating means or vibration generating sections which are provided in the upper substrate 12 at the opposite lateral sides of the first support beam 15. As shown particularly in FIG. 3, each of the vibration generating sections 18 includes a toothed or dentiform movable conducting portion 18A formed at a lateral side of the first support beam 15 and a complementarilly shaped fixed conducting portion 18B formed on the part of the upper-substrate 12 in face to face relation with the movable conducting portion 18A, the movable and fixed conducting sections 18A and 18B being interlaced or intermeshed in a small gap relation with each other and connected to an oscillator circuit (not shown) which produces a predetermined frequency signal. As soon as a frequency signal is applied to the movable and fixed conducting sections 18A and 18B from the oscillator circuit, the first vibratory member 14 is put in vibration in the direction X—X together with the second vibratory member 16 by the attracting and repulsive electrostatic forces which occur between the opposing conducting sections 18A and 18B.

Denoted at 19 is a displacement detection means or a displacement detector which is located on and over the adjacent areas of the first vibratory member 14 and the base end of the second support beam 17. As shown also in FIG. 4, the displacement detector 19 is constituted by: first diffused resistors 19A (i.e., piezoresistance elements) which are located in transversely spaced positions on the second support beam 17; and second diffused resistors 19B (i.e., piezoresistance elements) which are located on the first vibratory member 14 in positions close to the base end of the second support beam 17. In this instance, the respective diffused resistors 19A and 19B which serve as piezoresistance elements are formed by diffusing impurities such as phosphorus, boron, aluminum, arsenic, antimony and the like into the upper substrate 12. These diffused resistors 19A and 19B are arranged into a bridge circuit by means of metal wires 20, and connected to a signal processing circuit (not shown) which is formed, for example, on the upper substrate 12.

The second support beam 17 is subjected to a certain degee of strain (stress) as the second vibratory member 16 is vibrated (displaced) in the direction Z—Z under the influence of Coriolis force resulting from rotation of the sensor. This strain (stress) on the second support beam 17 is detected by the displacement detector 19 by way of a variation in resistance to output an angular velocity signal to the signal processing circuit.

The paired first diffused resistors 19A which are located in transversely spaced positions on the second support beam 17 in the above-described manner are subjected to compressive stress and tensile stress, respectively, in inverse relations with each other. Namely, the rates of resistance variation under the piezoresistance effects of the two diffused resistors 19A are expressed by figures with inverse signs. It follows that the angular velocity can be detected by comparatively computing their resistance variation rates.

Indicated at 21 in FIG. 2 is a protective layer of a nitride film or the like which is formed on the top surface of the upper substrate 12.

The angular velocity sensor of the first preferred embodiment, with the above-described construction, can be fabricated by the method as described below with reference to FIGS. 5 through 9.

Figure 5:
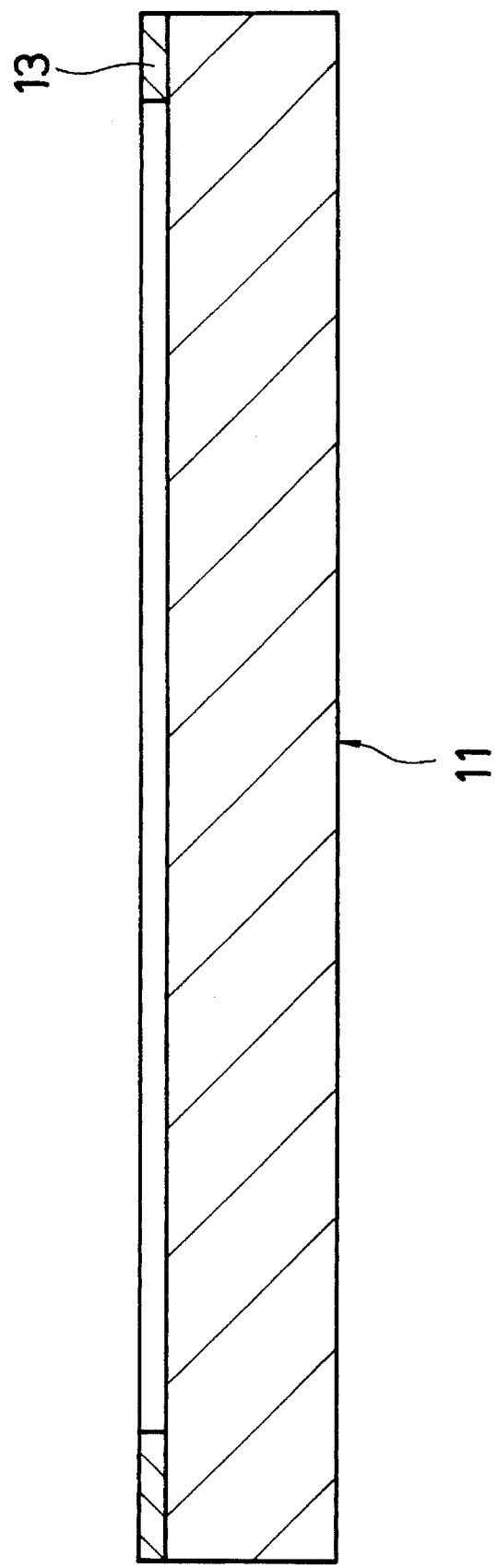
FIG. 5 is a sectional view explanatory of a step of forming an oxide film.

Firstly, in an oxide film-forming step shown in FIG. 5, an oxide film is formed on the top surface of the lower substrate 11, for example, by a thermal oxidation process or the like, and the resulting oxide film is etched off except a rectangular frame-like area 13 of the oxide film on which the upper substrate 12 is to be supported.

Figure 6:
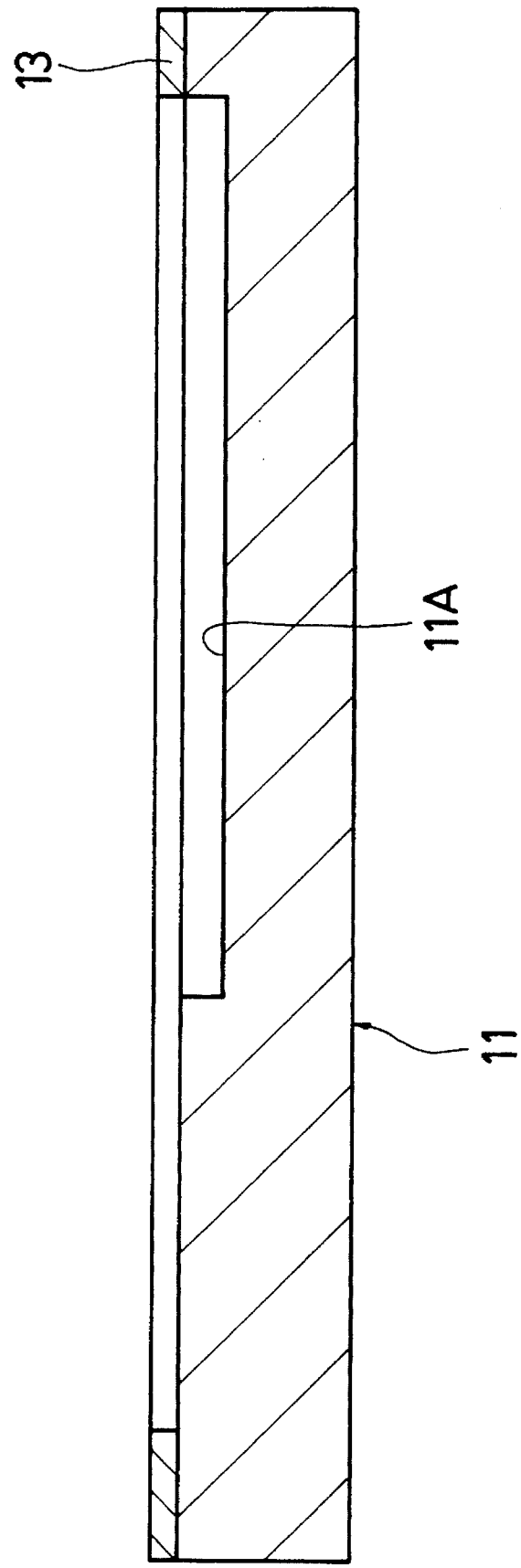
FIG. 6 is a sectional view explanatory of a step of forming a recess.

Nextly, in a recessing step shown in FIG. 6, an upper surface portion of the lower substrate 11, which corresponds to the second vibratory member 16, is removed by etching, thereby forming a rectangular recess 11A on the top side of the lower substrate 11.

Figure 7:
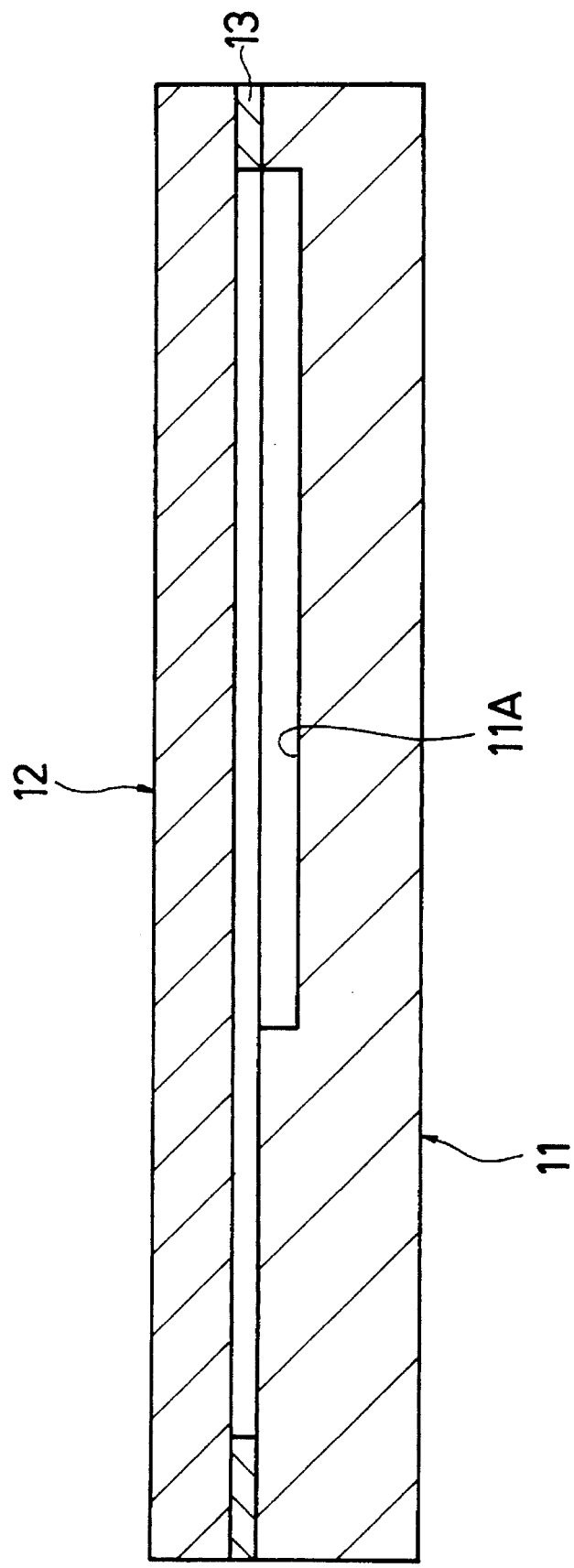
FIG. 7 is a sectional view explanatory of a substrate joining step.

Then, in a joining step shown in FIG. 7, an upper substrate 12 which is delivered from a separate line, is mounted on top of the lower substrate 11 through the oxide film 13, and the upper and lower substrates are united by direct silicon coalescing techniques, followed by a polishing operation to reduce the upper substrate 12 to a predetermined thickness.

Figure 8:
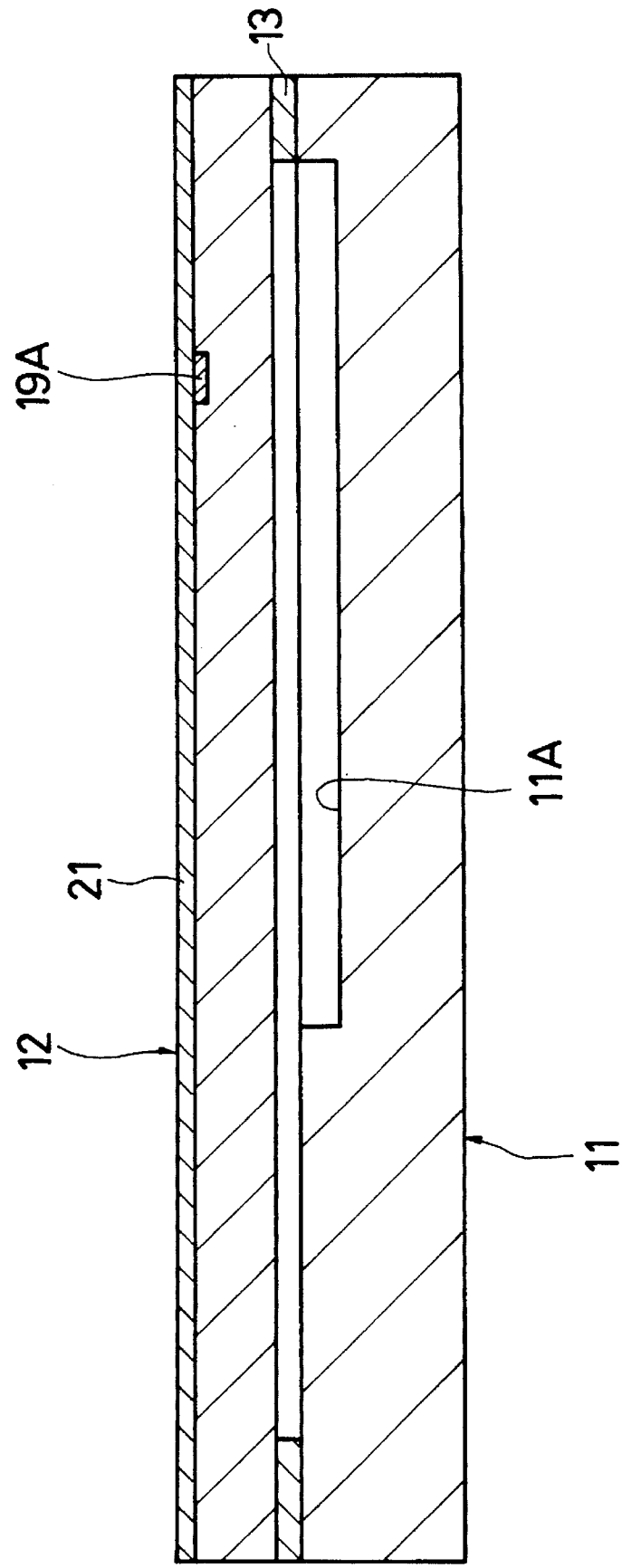
FIG. 8 is a sectional view explanatory of a step of forming elements on the substrate.

Further, in an element-forming step shown in FIG. 8, the elements for such as vibration generating sections 18, displacement detector 19 (one diffused resistor 19A alone is shown in that figure), and metal wiring 20 are formed on the upper surface of the upper substrate 12 by impurity introduction technics or by photolithography, and then a protective layer 21 is formed on the upper substrate 12 in such a manner as to cover these elements.

Figure 9:
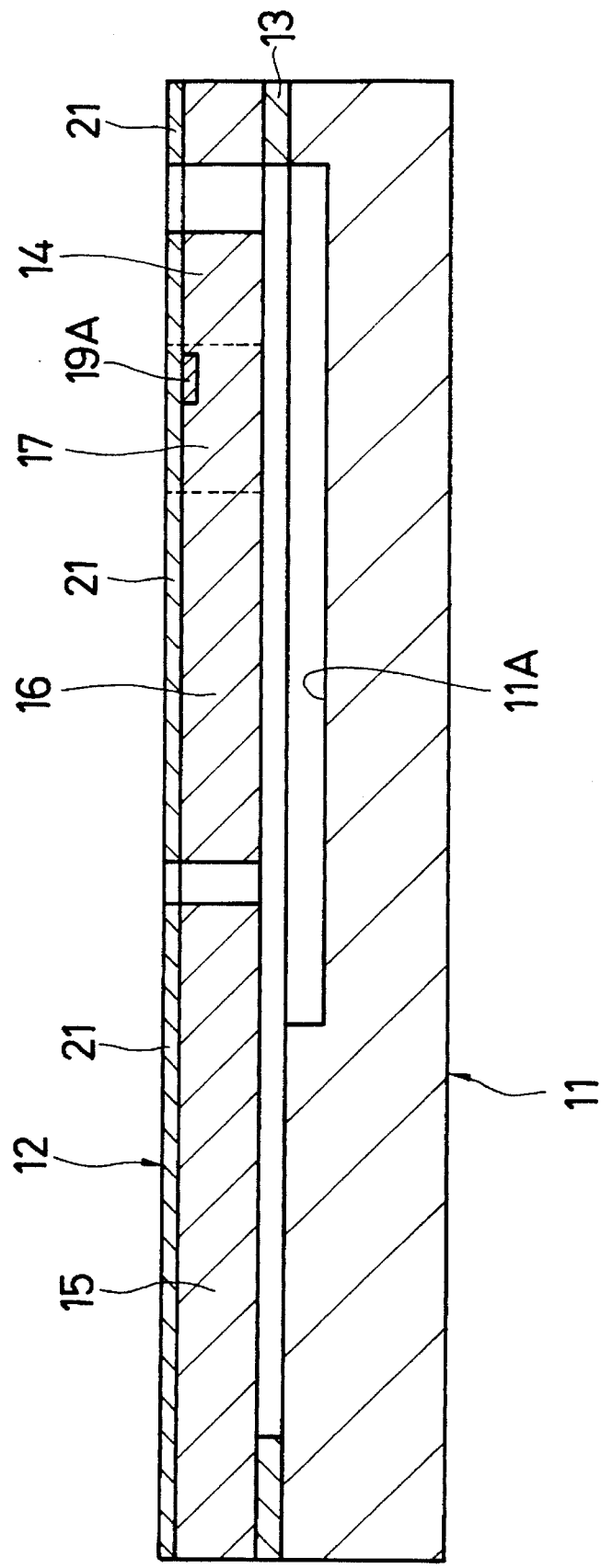
FIG. 9 is a sectional view explanatory of a step of forming vibratory members.

Finally, in a vibratory member forming step shown in FIG. 9, the upper substrate 12 is etched in a predetermined pattern to define the respective vibratory members 14 and 16 and support beams 15 and 17 on the upper substrate 12. At this time, the respective conducting portions 18A and 18B of the vibration generating sections 18 are formed into the complementarilly toothed shapes.

In the angular velocity sensor of this embodiment, which is fabricated in the above-described manner, upon applying a frequency signal to the respective vibration generating sections 18 from the oscillator circuit, the first support beam 15 is put in vibration in the horizontal direction X—X laterally of the upper substrate 12 and perpendicularly to the support axis of the first support beam 15 under the influence of the electrostatic forces occurring between the conducting portions 18A and 18B of each vibration generating sections 18.

As a result, the first vibratory member 14 is vibrated in the direction X—X, accompanied by vibration of the second vibratory member 16 in the direction X—X. At this time, since the second vibratory member 16 is connected to the first vibratory member 14 through the second support beam 17, the amplitude of its vibration becomes larger than that of the first vibratory member 14 as mentioned hereinbefore.

In this state, namely, with the respective vibratory members 14 and 16 held in vibration in the direction X—X, if a torque T is applied to turn the sensor as a whole about the support axis O—O, the second vibratory member 16 which is supported by the second support beam 17, is vibrated also in the vertical direction Z—Z in FIG. 2 under the influence of Coriolis force which is proportional to the angular velocity of the torque acting on the sensor.

As a consequence, the second support beam 17 is subjected to straining in a degree corresponding to the amount of displacement of the second vibratory member 16, while the compressinve stress and tensile stress exerted by the straining are detected through the piezoresistance effects of the diffused resistors 19A and 19B, which output angular velocity signals to the signal processing circuit.

Thus, the angular velocity sensor according to the present invention employs the rectangular frame-like first vibratory member 14 which is supported on the first support beam 15 for vibrations in the horizontal direction X—X laterally of the upper substrate 12 and perpendicularly to the support axis O—O of the first support beam 15, and the second vibratory member 16 which is supported horizontally on the second support beam 17 in a position located on the support axis O—O of the first support beam 15 within the first vibratory member 14 for vibrations in the direction X—X and also in the vertical direction Z—Z to the face of the upper substrate 12, in combination with the vibration generating sections 18 to vibrate the first and second vibratory members 14 and 16 in the direction X—X while detecting by the displacement detector 19 the displacement of the second vibratory member 16 as resulting from vibration in the vertical direction Z—Z under the influence of Corioli's force. Accordingly, it becomes possible to detect correctly the angular velocity of the torque T which is applied about the support axis O—O of the support beams 15 and 17, with the advantageous effects as follows.

Firstly, the two vibratory members 14 and 16 are put in vibrations in the horizontally lateral direction by the vibration generating sections 18, so that the influence of the viscous resistance of ambient air on the respective vibratory members 14 and 16 can be reduced to a marked degree, thereby permitting to vibrate the respective vibratory members 14 and 16 in a greater amplitude for the purpose of enhancing the sensitivity of detection.

Secondly, by the constitution of the first suport beam 15 which serves as an exciting beam in combination with the second support beam 17 which serves as a detection beam, the displacement detector 19 can be effectively prevented from picking up vibrations of the first support beam 15 which would increase the background noise, thereby enhancing the sensitivity and accuracy of detection considerably and thus permitting to detect correctly even fine angular velocities.

Thirdly, the recess 11A or the vibratory members 14 and 16 are formed integrally with the lower substrate 11 or upper substrate 12 of silicon material by microelectronic semiconductor processing techniques such as etching, so that it becomes possible to fabricate a plural number of angular velocity sensor units on silicon wafers of the same material. This has a great advantage that angular velocity sensors of uniform characteristics can be fabricated effectively on a mass scale and at a significantly reduced cost.

Fourthly, for example, for the purpose of quickly responding to market demands, the support beams 15 and 17 can be easily adapted to have the modulus of elasticity corresponding to required conditions of detection such as the range and accuracy of detection, can be easily obtained by suitably adjusting their shapes or dimensions, especially the lengths, widths or thicknesses of the respective support beams.

Figure 10:
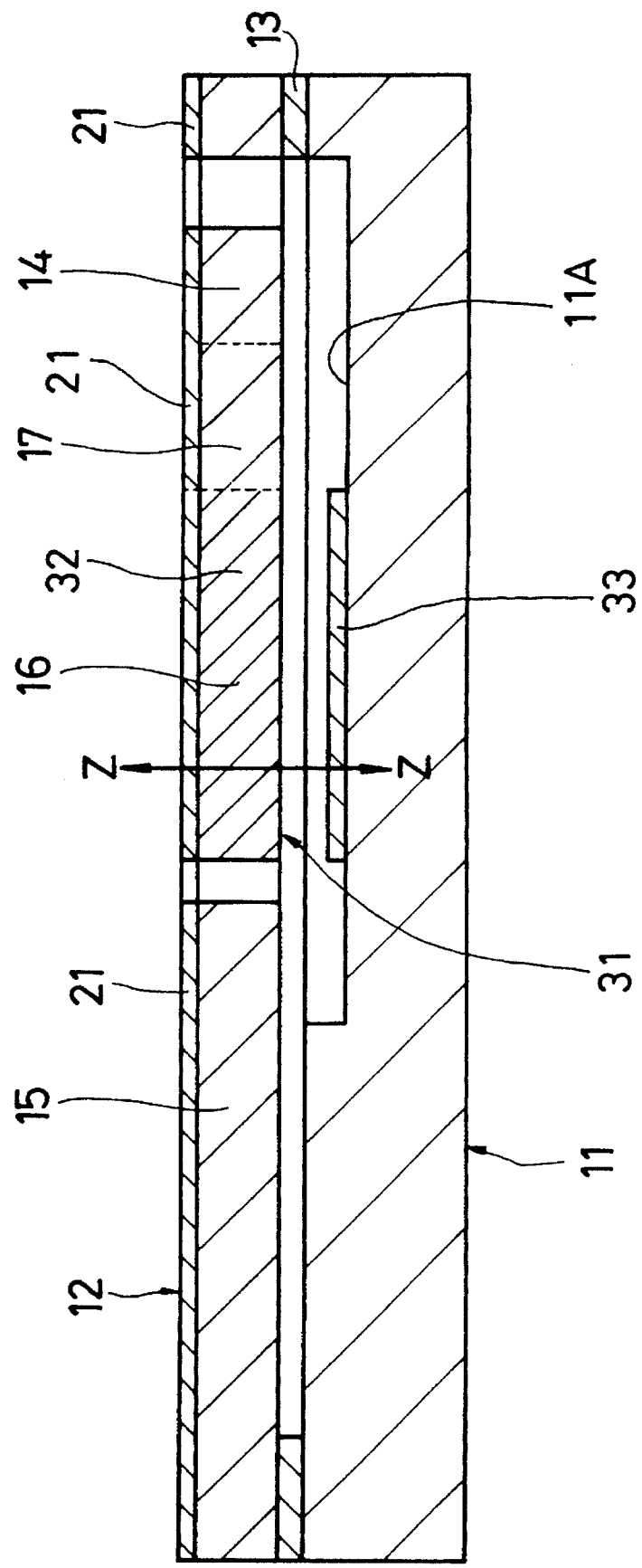
FIG. 10 is a view similar to FIG. 2 but showing an angular velocity sensor in a second embodiment of the invention.

Referring now to FIG. 10, there is shown a second embodiment of the present invention. In the following description, the component parts common with the foregoing first embodiment are designated by common reference numerals and their explanations are omitted to avoid repetitions.

In short, this second embodiment is characterized by that a capacitance type displacement detector 31 is employed in place of the piezoresistance type displacement detector 19 with the diffused resistors 19A and 19B.

Namely, indicated at 31 is the capacitance type displacement detector which is constituted by an upper conducting portion 32 provided on the second vibratory member 16 and a lower conducting portion 33 provided within the recess 11A on the lower substrate 11 in opposingly confronting relation with the upper conducting portion 32. In this instance, the upper conducting portion 32 is formed by diffusion of impurities such as phosphorus, arsenic, boron or the like or by ion-implantation into the upper substrate 12 of silicon material in those areas which will be shaped into the second vibratory member 16, thereby forming a low resistance portion of 0.01 to 0.02 $\Omega$cm to serve as an electrode. On the other hand, the lower conducting portion 33 is constituted by an electrode in the form of a strip of metallic material which is affixed on the recess 11A on the lower substrate 11.

In the second embodiment which is arranged in the above-described construction, as the second vibratory member 16 is vibrated (displaced) in the vertical direction Z—Z under the influence of Coriolis force, the capacitance between the upper and lower conducting portions 32 and 33, namely, between the associated electrodes of the displacement detector 31 is varied correspondingly. The detected value of capacitance is fed to the signal processing circuit as an angular velocity signal. In this manner, the displacement detector 31 is capable of detecting the angular velocity of the torque exerted on the respective support beams 15 and 17 correctly by way of the value of capacitance. In the above-described second embodiment, the upper conducting portion 32 which serves as one electrode is provided by forming a low resistance portion in part of the upper substrate 12. However, the conducting portion may be of any form as long as the inter-electrode capacitance is detectible, for example, may be a strip of metallic material which is affixed on the lower side of the upper substrate 12.

Further, each one of the foregoing embodiments, the vibration generating means is constituted by the vibration generating sections 18 each having the movable and fixed conducting portions 18A and 18B arranged in small gap relation with each other to vibrate the respective vibratory members 14 and 16 by the electrostatic forces which occur between the two conducting portions 18A and 18B. However, the present invention is not restricted to this arrangement and may employ other vibration generating means, for example, a conducting portion which is formed on part of the first support beam 15 to serve as a heater and which is intermittently supplied with current to generate heat, causing the respective vibratory members 14 and 16 to vibrate through thermal expansions.

Figure 11:
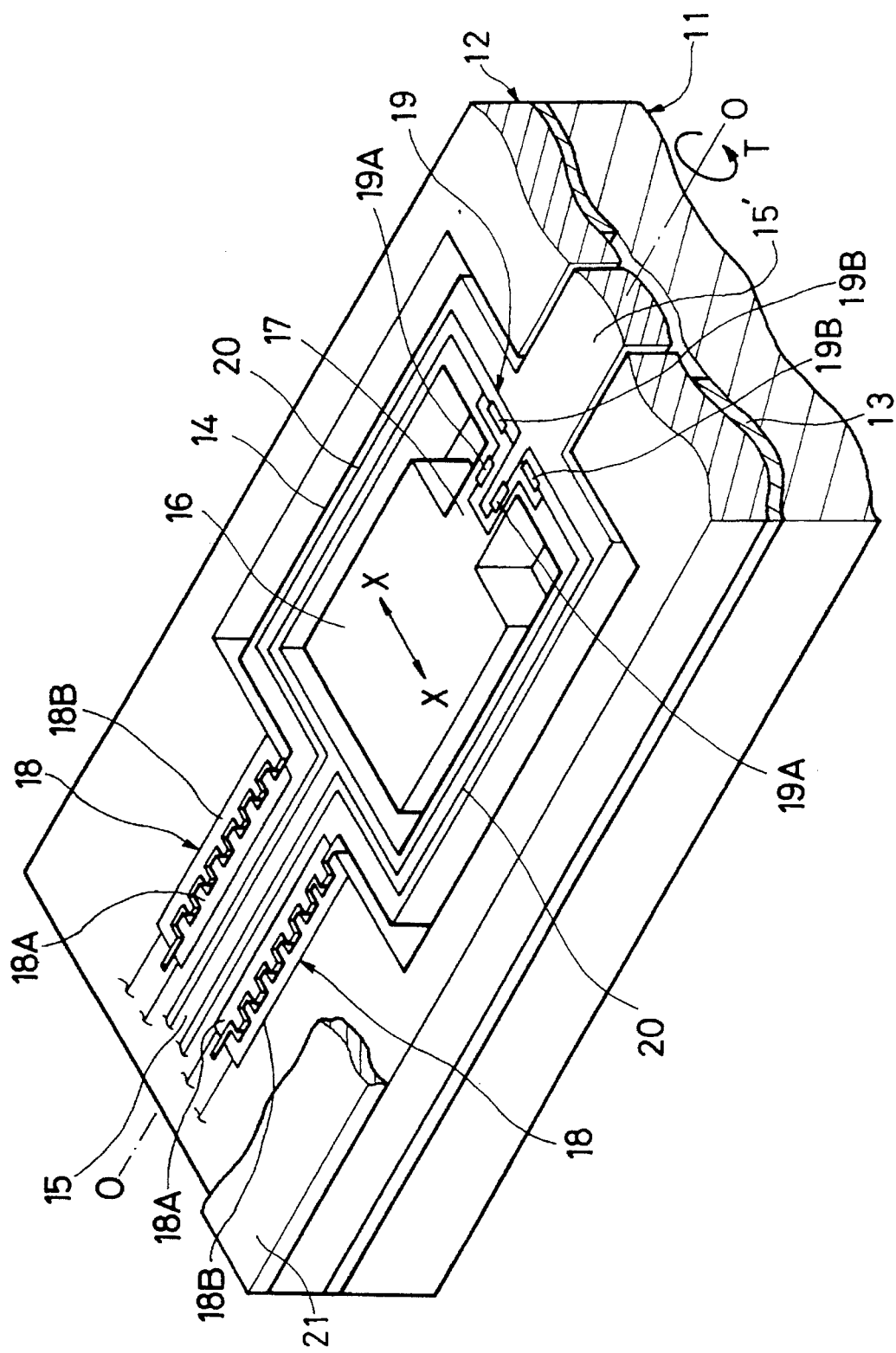
FIG. 11 is a perspective view of a modification of the angular velocity sensor according to the invention, the sensor having its outer protective layer removed for the purpose of illustration.

Further, instead of supporting the first vibratory member 14 on one and single first support beam 15 in the fashion of cantilever as in the foregoing embodiments, there may be employed a dual Support type vibratory member as in the modification of FIG. 11, wherein the first vibratory member 14 is supported at both ends by a pair of support beams 15 and 15' located on the support axis O—O. In this instance, the above-described vibration generating sections may be provided on the support beam 15' if desired.

Moreover, the diffused resistors 19A and 19B which are employed as piezoresistance elements for the displacement detector 19 in the foregoing embodiments may be replaced by field-effect transistors with piezoresistance effects.

On the other hand, although the angular velocity sensor has been described as an independent unit in the foregoing embodiments, it is possible to apply the present invention to form a plural number of angular velocity sensors on part of a substrate to be mounted on a motor vehicle or the like.

INDUSTRIAL APPLICABILITY

As clear from the foregoing detailed description, the angular vehicle sensor according to the present invention is arranged to impart vibrations to the first and second vibratory members by the vibration generating means in the horizontal direction laterally of the substrate, and, when a torque is applied about the support axis of the first support beam, to detect by the displacement detector the extent of displacement of the second vibratory member being vibrated also in the vertical direction to the substrate under the influence of Corioli's force. These arrangements contribute to enhance the sensitivity of detection of angular velocities significantly by reducing the influence of viscous resistance of gases in association with the respective vibratory members to a marked degree. Besides, the first and second support beams are used as an exciting beam and a detection beam, respectively, so that the displacement detection means can be dissociated from the displacements of the first support beam to suppress the background noises effectively, thereby enhancing the sensitivity and accuracy of detection to such a degree as to permit correct measurements of fine angular velocities.

What is claimed is:

1. A semiconductor angular velocity sensor, comprising:

a substrate;

a first vibratory member supported on said substrate and parallel thereto through a first support beam for vibration in a lateral direction relative to said substrate;

a second vibratory member supported in axial alignment with the support axis of said first support beam and supported on said first vibratory member and parallel thereto through a second support beam for vibrating in the lateral direction and also in a perpendicular direction relative to the face of said substrate;

a vibration generating means vibrating said first vibratory member and second vibratory member in the lateral direction relative to said substrate; and a displacement detection means detecting the extent of displacement of said second vibratory member in the perpendicular direction while the second vibratory member is vibrated by the vibration generating means.

2. An angular velocity sensor as defined in claim 1, wherein said vibration generating means is constituted by movable conducting sections located at opposite lateral sides of said first support beam and stationary conducting sections provided on the part of said substrate in face to face relation with said movable conducting sections, and vibrates said first vibratory member together with said second vibratory member upon application of a frequency signal to the respective conducting sections.

3. An angular velocity sensor as defined in claim 1, wherein said displacement detection means is constituted by a bridge circuit containing a pair of piezoresistance elements located on said second support beam in spaced positions in the transverse direction thereof and a pair of piezoresistance elements located on said first vibratory member.

4. An angular velocity sensor as defined in claim 1, wherein said displacement detection means is constituted by a conducting section provided on said second vibratory member and another conducting section provided on said substrate in confronting relation with said first-mentioned conducting section, and adapted to detect a displacement of said second vibratory member in said perpendicular direction by way of a variation in capacitance between said two conducting sections.

5. An angular velocity sensor as defined in claim 1, wherein said vibratory member is a cantilever frame having a central opening supported on said first support beam, and said second vibratory member is a cantilever plate supported on said second support beam in said central opening.

6. An angular velocity sensor as defined in claim 1, wherein said first vibratory memory is a frame having a central opening and the opposite ends thereof supported by a pair of said first support beams aligned with each other on a common support axis, and said second vibratory member is a cantilever plate supported on said second support beam in said central opening.

7. An angular velocity sensor as defined in claim 1, wherein said substrate is composed of a lower substrate and an upper substrate joined with each other through an insulation layer, said first and second vibratory members being integrally formed in said upper substrate in a shaping process for said upper substrate.

8. An angular velocity sensor as defined in claim 7, wherein said lower substrate includes a recess so that said first and second vibratory members can freely vibrate.

9. An angular velocity sensor as defined in claim 1, wherein said first vibratory member, said second vibratory member, said first support beam and said second support beam lie in the same plane.

10. An angular velocity sensor as defined in claim 1, wherein said displacement detection means is a diffused resistance element located on said second support beam which is formed by diffusing an impurity and said substrate is formed of a silicon material.

11. A semiconductor angular velocity sensor, comprising:

a substrate;

a first vibratory member in the shape of a frame having a central opening, supported on said substrate and parallel thereto through a first support beam for vibration in a lateral direction relative to said substrate;

a second vibratory member supported in axial alignment with the support axis of said first support beam and supported within the frame of said first vibratory member and parallel thereto through a second support beam for vibration in the lateral direction and also in a perpendicular direction relative to the face of said substrate;

a vibration generating means vibrating said first vibratory member and said second vibratory member in the lateral direction relative to said substrate; and a displacement detection means detecting the extent of displacement of said second vibratory member in the perpendicular direction while the second vibratory member is vibrated by the vibration generating means.

* * * * *